(12) United States Patent
Willoughby

(10) Patent No.: US 6,553,682 B1
(45) Date of Patent: Apr. 29, 2003

(54) TOUCH PROBE

(75) Inventor: Timothy R. Willoughby, Lock Haven, PA (US)

(73) Assignee: Paradyne, State College, PA (US)

( * ) Notice: Subject to any disclaimer, the term of this patent is extended or adjusted under 35 U.S.C. 154(b) by 0 days.

(21) Appl. No.: 09/525,725

(22) Filed: Mar. 14, 2000

Related U.S. Application Data

(60) Provisional application No. 60/142,333, filed on Jul. 3, 1999, provisional application No. 60/131,478, filed on Apr. 29, 1999, and provisional application No. 60/124,391, filed on Mar. 15, 1999.

(51) Int. Cl.[7] .............................................. G01B 5/20
(52) U.S. Cl. ......................................................... 33/561
(58) Field of Search .......................... 33/503, 556, 558, 33/559, 561

(56) References Cited

U.S. PATENT DOCUMENTS

| | | | | |
|---|---|---|---|---|
| 4,138,823 A | | 2/1979 | McMurtry | 33/559 |
| 4,155,171 A | | 5/1979 | McMurtry | 33/561 |
| 4,158,919 A | | 6/1979 | McMurtry | 33/556 |
| 4,288,925 A | | 9/1981 | McMurtry | 33/561 |
| 4,510,693 A | * | 4/1985 | Cusack | 33/558 |
| 4,769,919 A | * | 9/1988 | Lloyd et al. | 33/558 |
| 4,813,151 A | * | 3/1989 | Hajdukiewicz et al. | 33/561 |
| 5,353,514 A | * | 10/1994 | McMurtry | 33/558 |
| 5,435,072 A | * | 7/1995 | Lloyd et al. | 33/559 |
| 5,505,005 A | * | 4/1996 | McMurtry et al. | 33/558 |
| 5,848,480 A | * | 12/1998 | Sola et al. | 33/503 |
| 5,918,378 A | * | 7/1999 | McMurtry et al. | 33/556 |
| 6,012,230 A | * | 1/2000 | McMurtry et al. | 33/559 |
| RE37,030 E | * | 1/2001 | Lloyd et al. | 33/559 |
| 6,301,796 B1 | * | 10/2001 | Cresson | 33/556 |

* cited by examiner

*Primary Examiner*—G. Bradley Bennett
(74) *Attorney, Agent, or Firm*—John J. Elnitski, Jr.

(57) ABSTRACT

The present invention is a touch probe which can be connected to a computer controlled machine for determining positions of and defining shapes of work pieces, edges, hole centers and contours. The probe due to it design allows for a simpler and effective alternative to previous probes. The probe includes a body, stylus, a shank and an internal assembly. The body contains the internal assembly, which provide signals to a computer. The arrangement of the internal assembly is what makes the present invention simpler to manufacture and allow the probe to be miniaturized. The internal assembly includes an upper circuit board with a Light Emitting Diode (LED), a spring, a spring cap, a stylus mount, a housing, carbide balls, a lower circuit board, a support ring and wires.

18 Claims, 13 Drawing Sheets

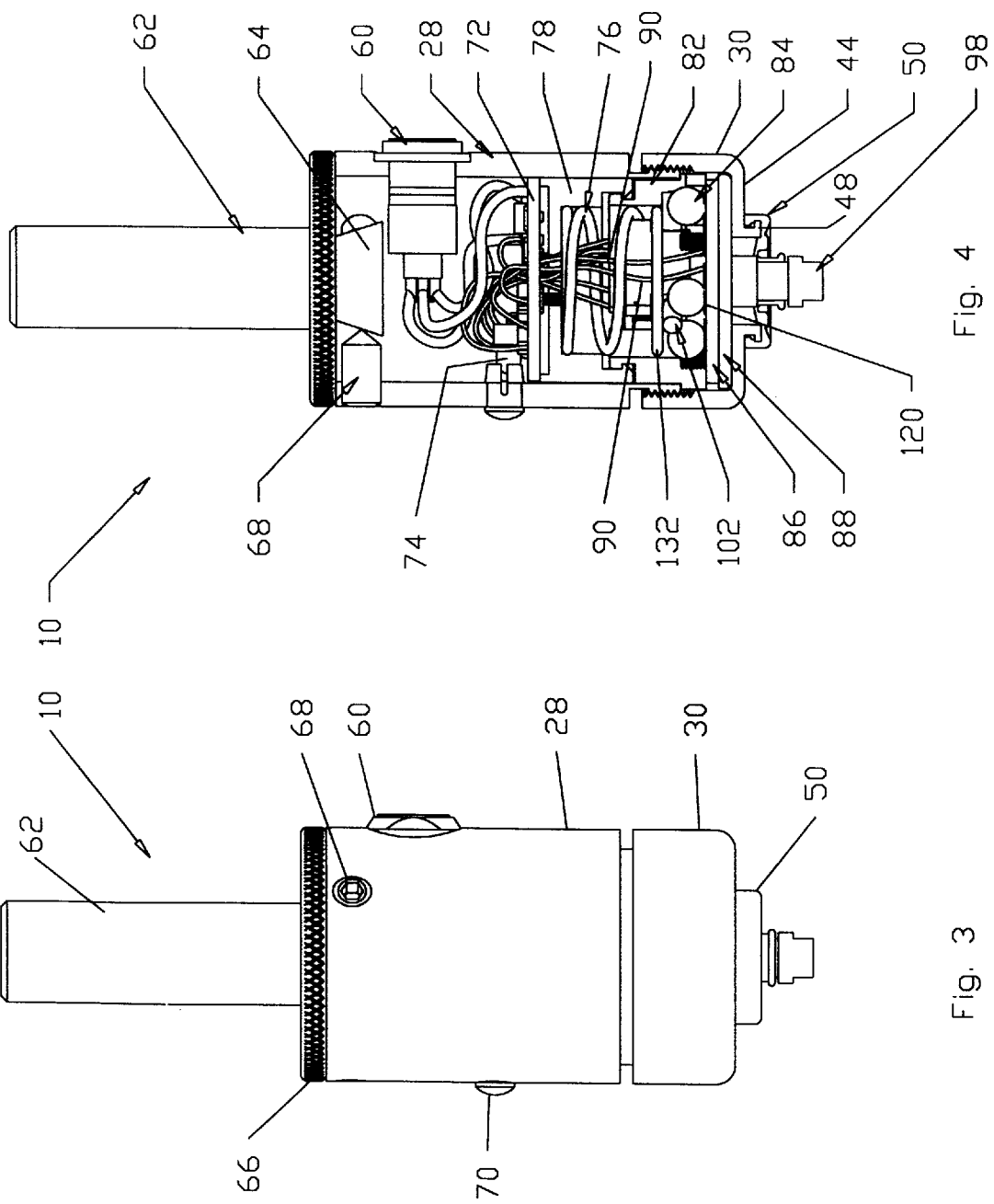

TOUCH PROBE

This application claims the benefit of U.S. Provisional Application Nos.: 60/124,391 filed Mar. 15, 1999, No. 60/131,478 filed Apr. 29, 1999, and No. 60/142,333 filed Jul. 3, 1999, and are hereby incorporated by reference.

BACKGROUND

Touch probes are devices known for uses such as measuring objects, determining positions of and defining shapes of work pieces, edges, hole centers and contours. There are many types of these devices available on the market. But, these devices can have complicated internal workings, which increase manufacturing costs and limit miniaturization of the device. With the increase capabilities in computers and software it is possible to transfer some of the complicated features away from the probe itself.

It is an object of the present invention to provide a touch probe which can be made smaller, which simplifies manufacture and which reduces the cost to manufacture.

SUMMARY OF THE INVENTION

The present invention is a touch probe which can be connected to a computer controlled machine for determining positions of and defining shapes of work pieces, edges, hole centers and contours. The probe due to it design allows for a simpler and effective alternative to previous probes. The probe includes a body, stylus, a shank and an internal assembly. The body contains the internal assembly, which provide signals to a computer. The arrangement of the internal assembly is what makes the present invention simpler to manufacture and allow the probe to be miniaturized. The internal assembly includes an upper circuit board with a Light Emitting Diode (LED), a spring, a spring cap, a stylus mount, a housing, carbide balls, a lower circuit board, a support ring and wires.

BRIEF DESCRIPTION OF THE DRAWINGS

FIG. 3 is a side view of the probe according to the present invention;

FIG. 4 is a cross-sectional side view of the probe according to the present invention;

DETAILED DESCRIPTION

Figure 1:
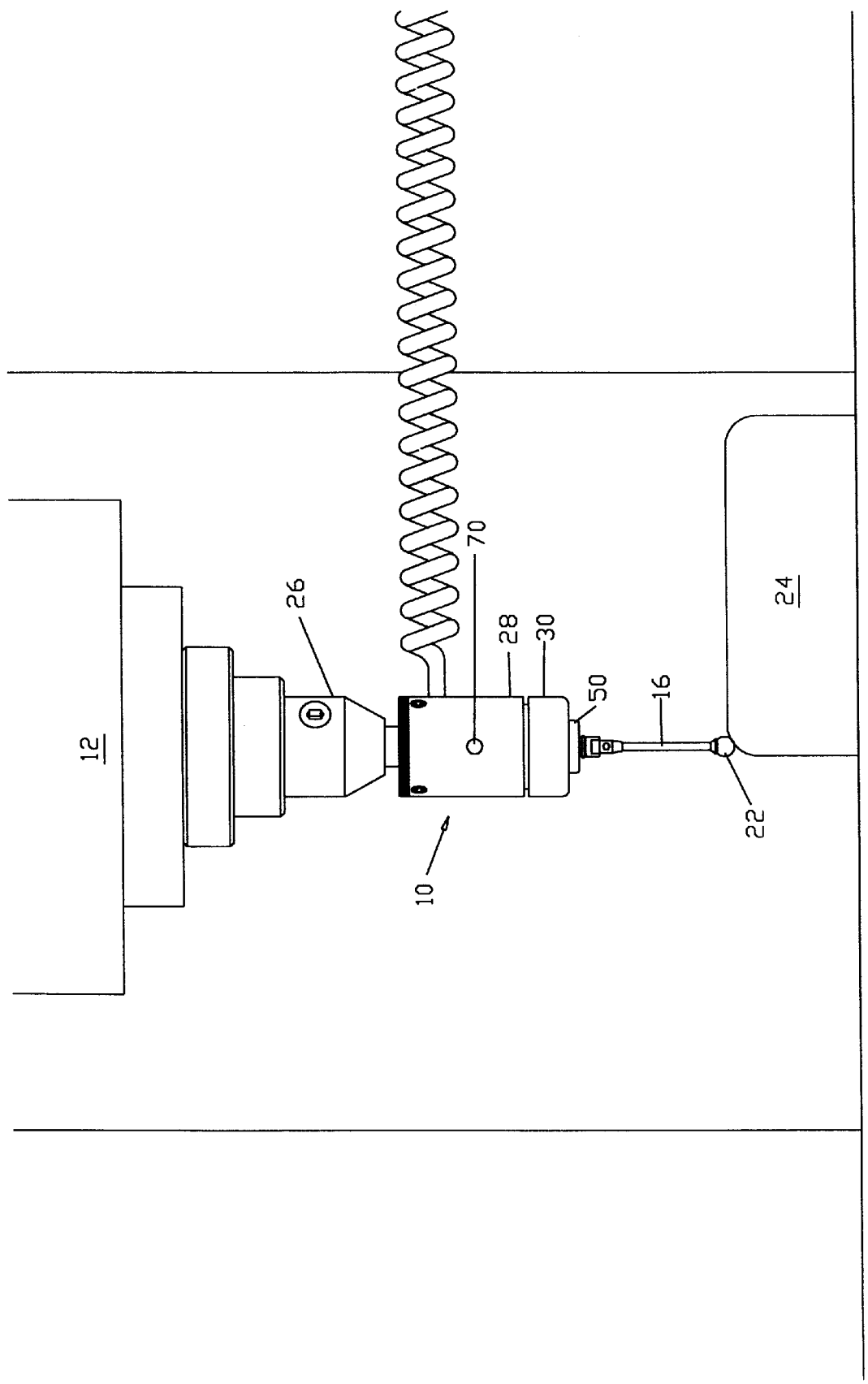
FIG. 1 is a side view of a probe connected to a machine according to the present invention.
Figure 7:
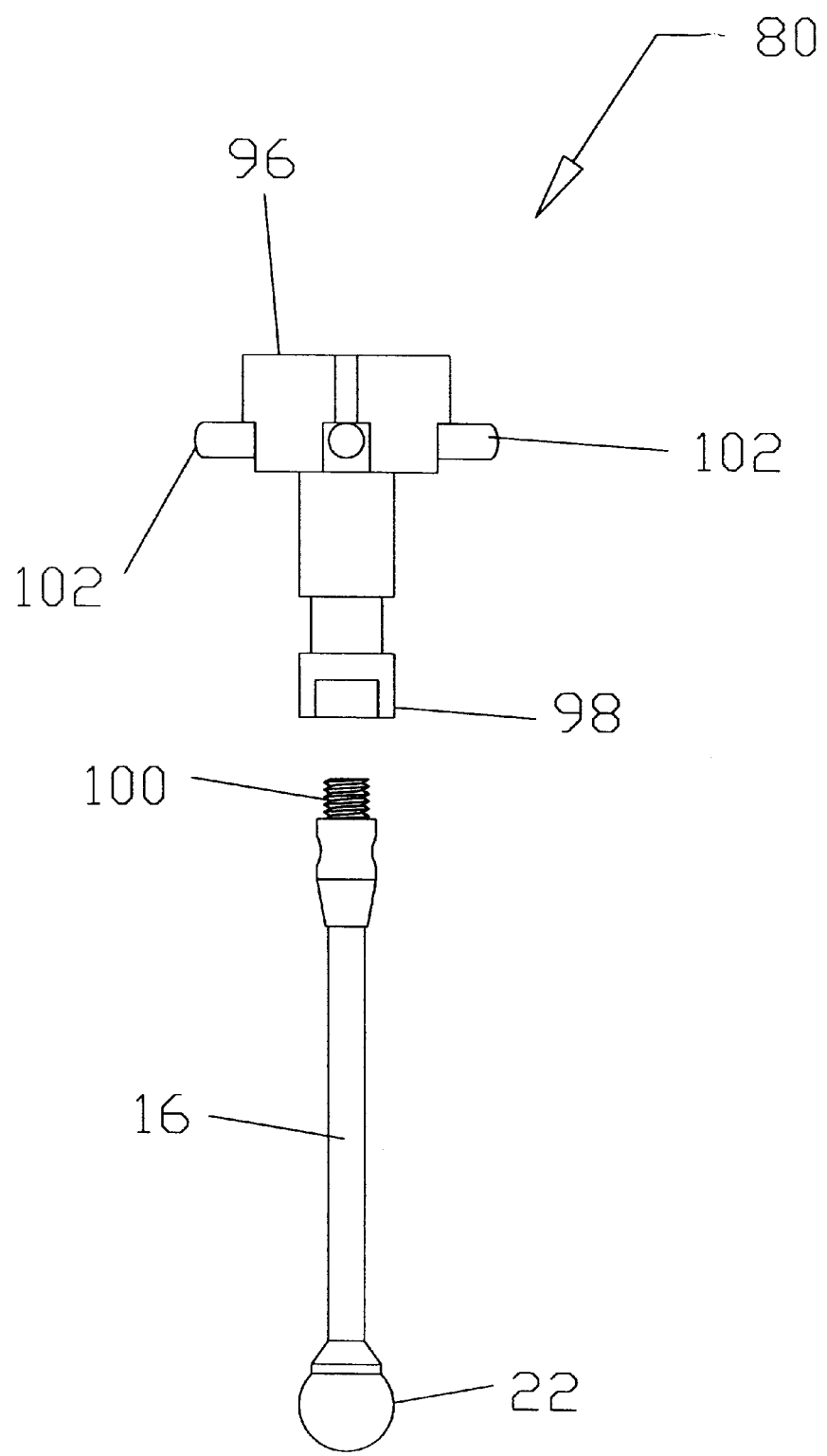
FIG. 7 is a side view of a stylus and stylus mount according to the present invention.

The present invention is a touch probe 10 which can be connected to a computer controlled machine 12 for determining positions of and defining shapes of work pieces, edges, hole centers and contours. The probe 10 includes a body 14, stylus 16, a shank 18 and an internal assembly 20, as shown in FIGS. 1–4. The body 14 contains the internal assembly 20, which provide signals to the computer for defining an object 24. The stylus 16 is a shaft with a round tip 22 that actually contacts the object 24 to be defined, as shown in FIGS. 1 and 7. The shank 18 extends upward from the body 14 and is inserted into a chuck 26 of the machine 12, whereby the machine 12 moves the probe 10 about the object 24 to be defined.

The body 14 is an open ended cylinder 28 with an end cap 30. The cylinder 28 includes a top 32 and bottom 34. The bottom 34 of the cylinder 28 includes threading 36 slightly recessed from an outside surface 38 of the cylinder 28. The end cap 30 includes an open ended top 40 having internal threading 42 and includes a closed bottom 44 having a stylus hole 46 to receive the stylus 16. The end cap 30 screws onto the bottom 34 of the cylinder 28. The stylus hole 46 includes a ridge 48 extending around it and extending outward from the end cap 30 to receive a molded rubber boot 50 to seal the stylus hole 46. The boot 50 includes a hole 52 which seals around the stylus 16 as it projects from the bottom 44 of the end cap 30. The cylinder 28 also includes three threaded set screw holes 54 near the top 32 of the cylinder 28, a lens hole 56 and a connector hole 58 to receive a connector receptacle 60. The connector receptacle 60 is wired to the internal assembly 20 and allows connection of a cable from the computer.

The shank 18 includes a machine attachment end 62, a reverse tapered boss 64 and a top cap between the attachment end and the boss 64. The boss 64 is inserted into the top of the cylinder 28, whereby the top cap 66 seals the top 32 of the cylinder 28. The shank 18 is secured to the body 14 using conical set screws 68. Whereby, the set screws 68 are threaded through the set screw holes 54, into the cylinder 28 and against the boss 64. The use of conical set screws 68 and the reversed tapered boss 64 allows for the quick and easy adjustment of the probe 10 concentricity with the machine 12 to which the probe 10 is installed. A clear snap-in lens 70 is shown to be snapped into the lens hole 56.

Figure 5:
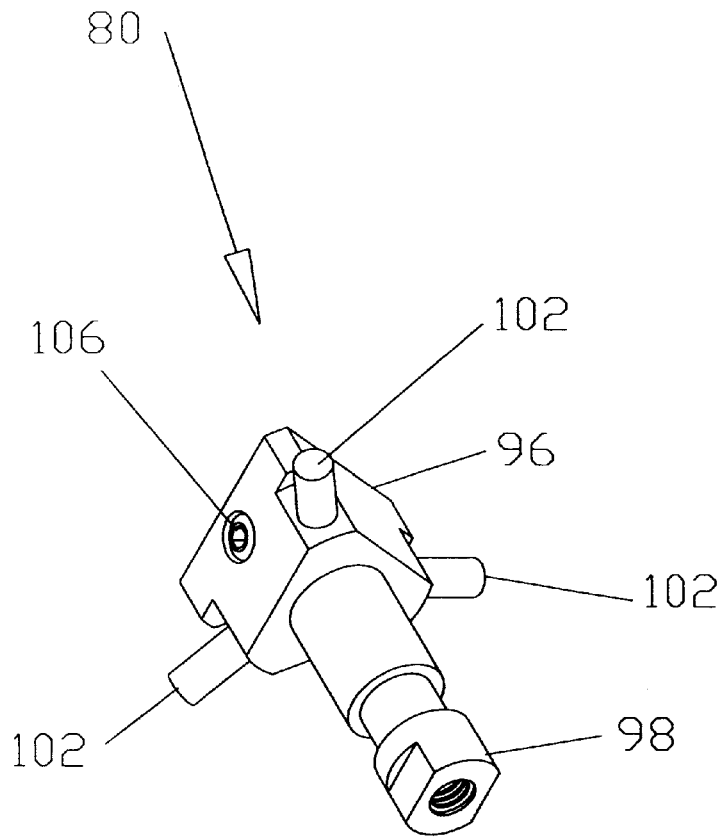
FIG. 5 is a top perspective view of a stylus mount according to the present invention.
Figure 6:
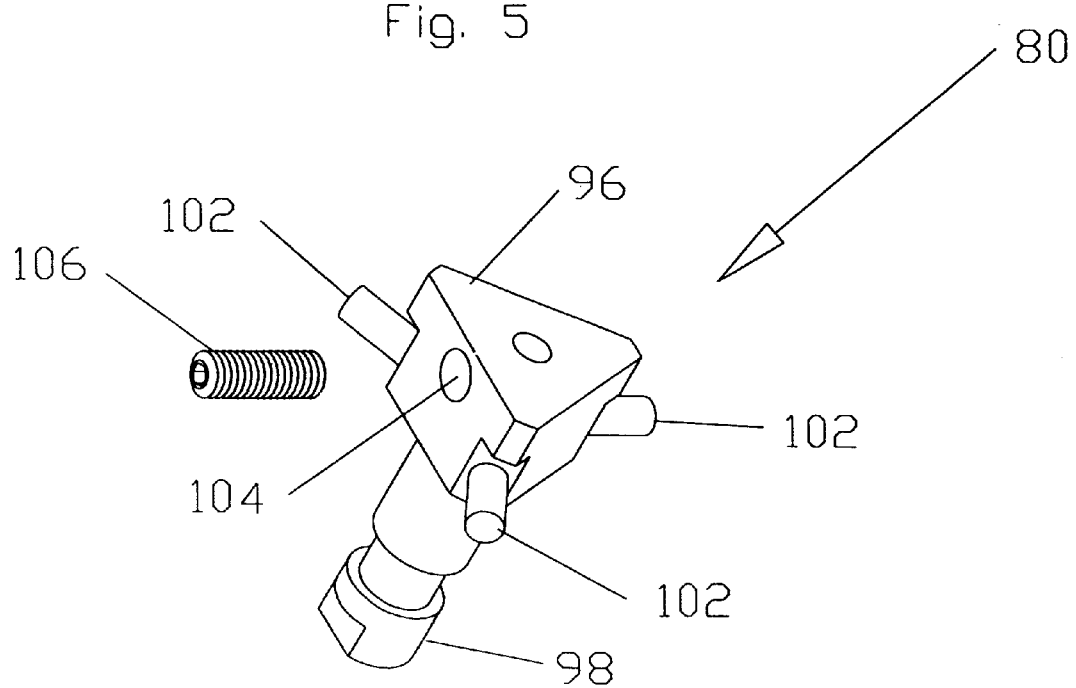
FIG. 6 is a bottom perspective view of a stylus mount according to the present invention.

The internal assembly 20 includes an upper circuit board 72 with a Light Emitting Diode (LED) 74, a spring 76, a spring cap 78, a stylus mount 80, a housing 82, carbide balls 84, a lower circuit board 86, a support ring 88 and wires 90. The upper circuit board 72 is secured with screws to a top of the spring cap 78. The upper circuit board 72 is wired to the connector receptacle 60 and contains solid state electronics for collecting and transmitting the signals to the computer connected to the probe 10. The stylus mount 80 includes a top 96 and a bottom 98, as shown in FIGS. 5–6. The bottom 98 of the stylus mount 80 is internally threaded to receive a threaded top 100 of the stylus 16. The top 96 of the stylus mount 80 includes three equally spaced steel pins 102 extending outward from the top 96. The top 96 of the stylus mount 80 also includes a set screw hole 104 and a set screw 106. The set screw 106 is electrically connected to the pins 102 via the stylus mount 80 when in the set screw hole 104 and is use to secure a ground wire to the stylus mount 80. The housing 82 has a top 108, a bottom 110 and a continuous side 112, as shown in FIGS. 2, 8–11. The bottom of the housing 82 includes six ball holes 114 around its periphery and a center hole 116. The ball holes 114 are configured such that a portion of each ball 84 extends into the housing 82 from the bottom 110 of the housing 82, but each ball 84 is restrained from fully entering the housing 82. The ball holes 114 are also configured so that there are three sets of paired balls 84, whereby the three sets are equally space apart similar to the three pins 102. The balls holes of each set are close together to allow the each of the paired balls 84 to support one each of the three pins 102 of the stylus mount 80 between the paired balls 84. The housing 82 is shown with three slots 118 in the side 112 of the housing 82 to receive and guide the pins 102. When in place, the stylus mount 80 is inserted into the housing 82 from the top 108 of the housing 82, such that the bottom 98 of the stylus mount 80 projects through the center hole 116 of the housing 82 and the pins 102 are in the slots 118 and contact the balls 84.

Figure 2:
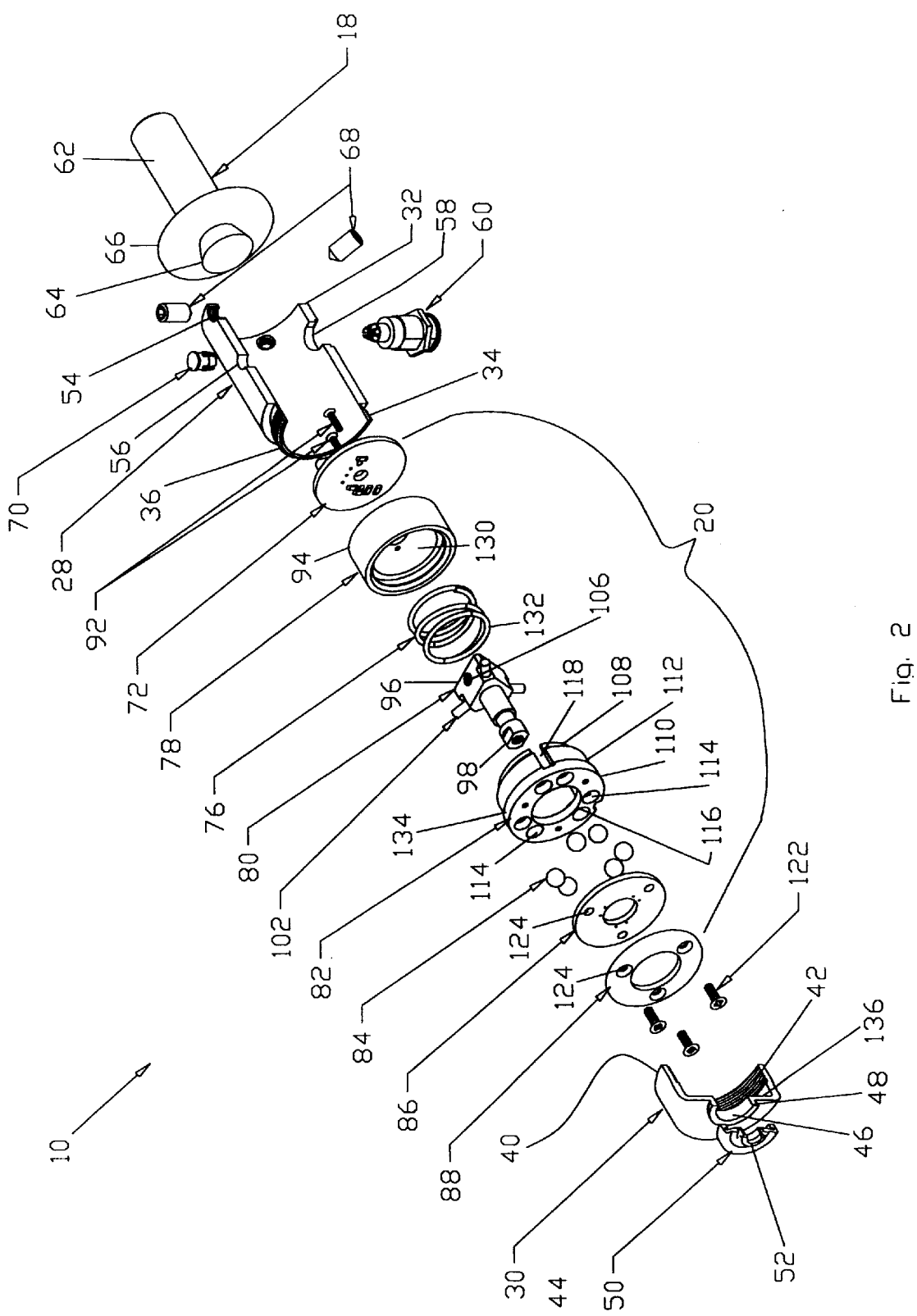
FIG. 2 is an exploded view of the probe according to the present invention.
Figure 8:
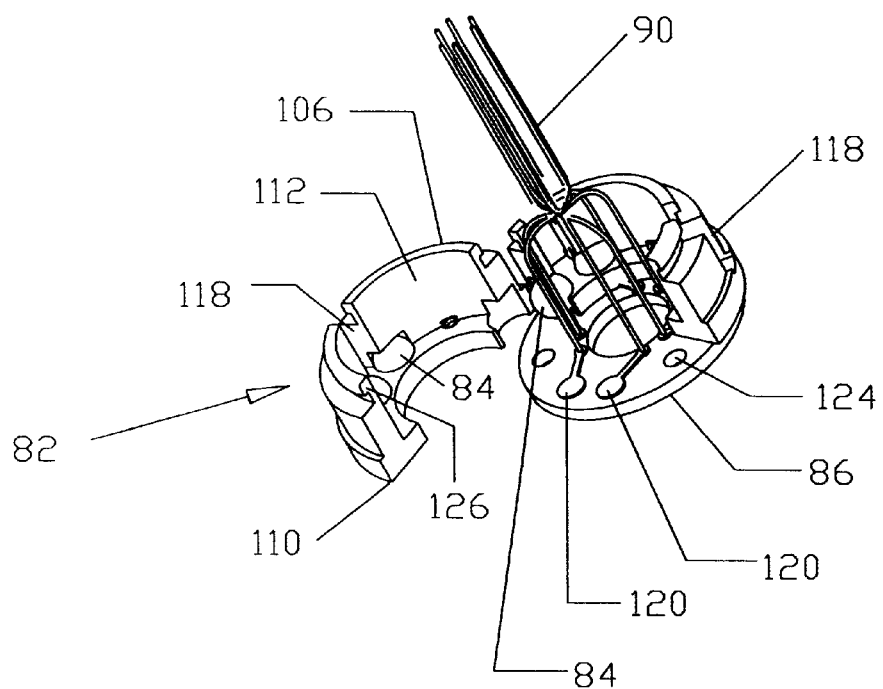
FIG. 8 is a top perspective view of a housing according to the present invention.
Figure 9:
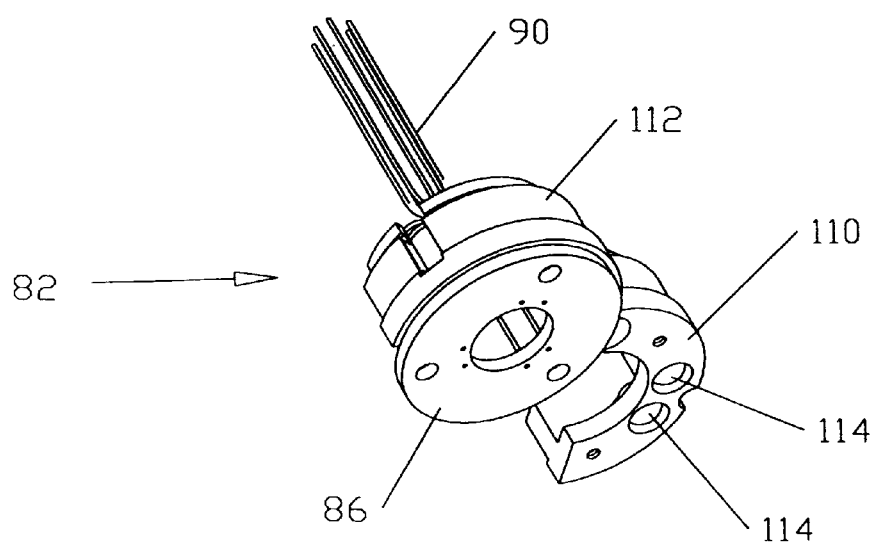
FIG. 9 is a bottom perspective view of a housing according to the present invention.
Figure 10:
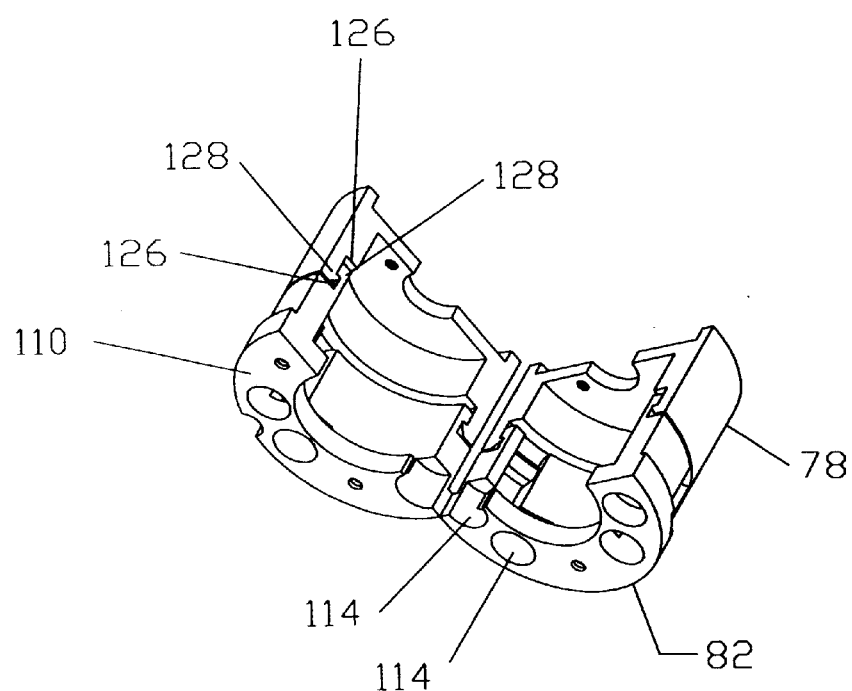
FIG. 10 is a top perspective view of a housing and spring cap according to the present invention.
Figure 11:
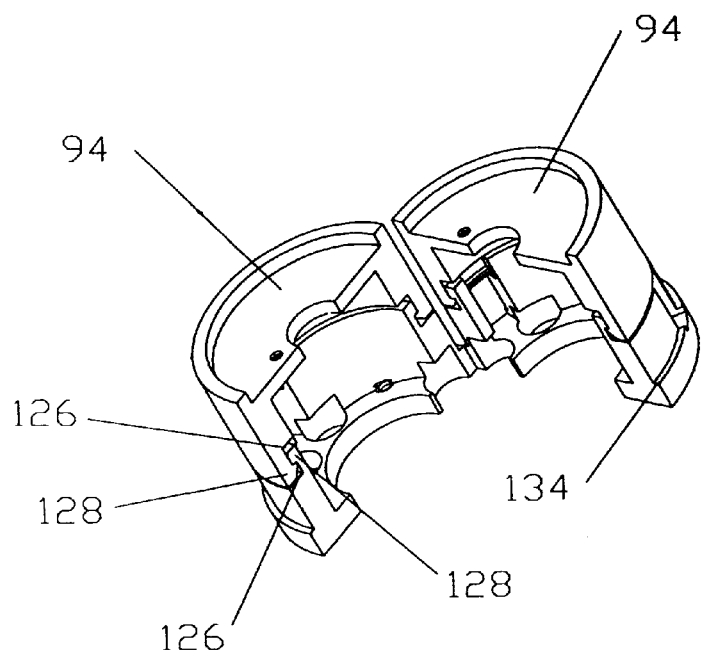
FIG. 11 is a bottom perspective view of a housing and spring cap according to the present invention.
Figure 12:
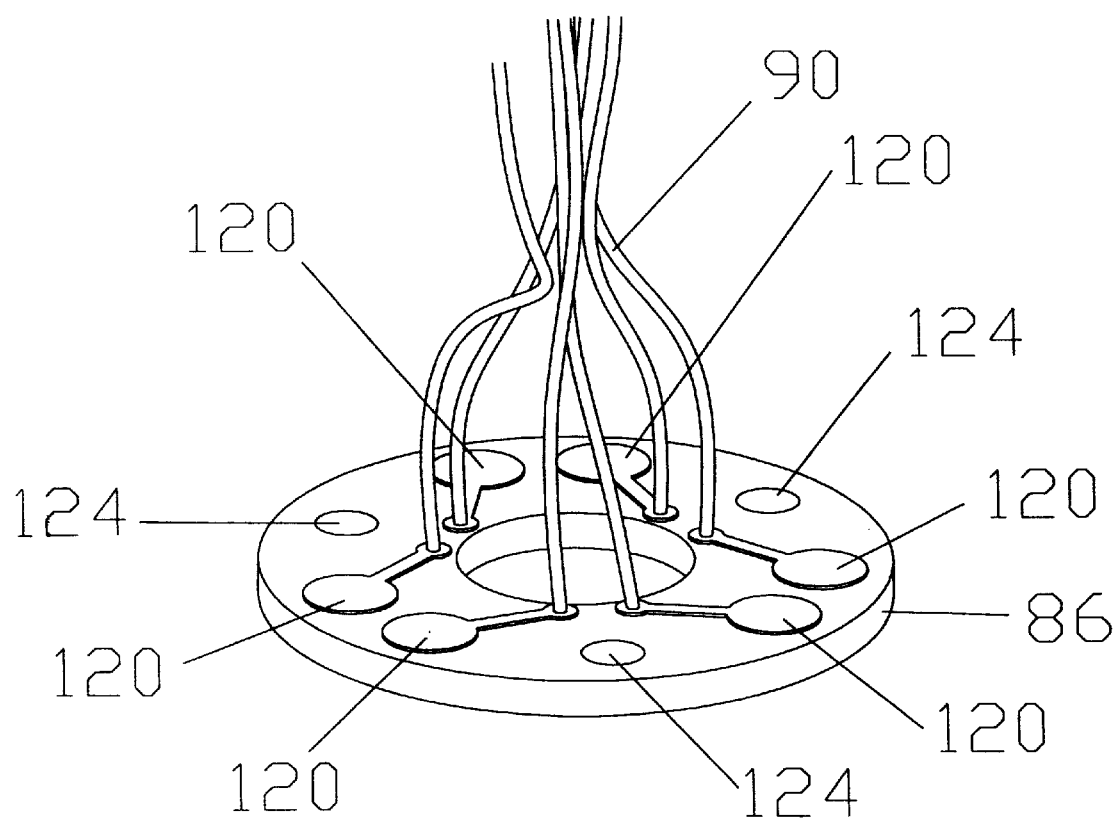
FIG. 12 is a top perspective view of a lower circuit board according to the present invention.
Figure 13:
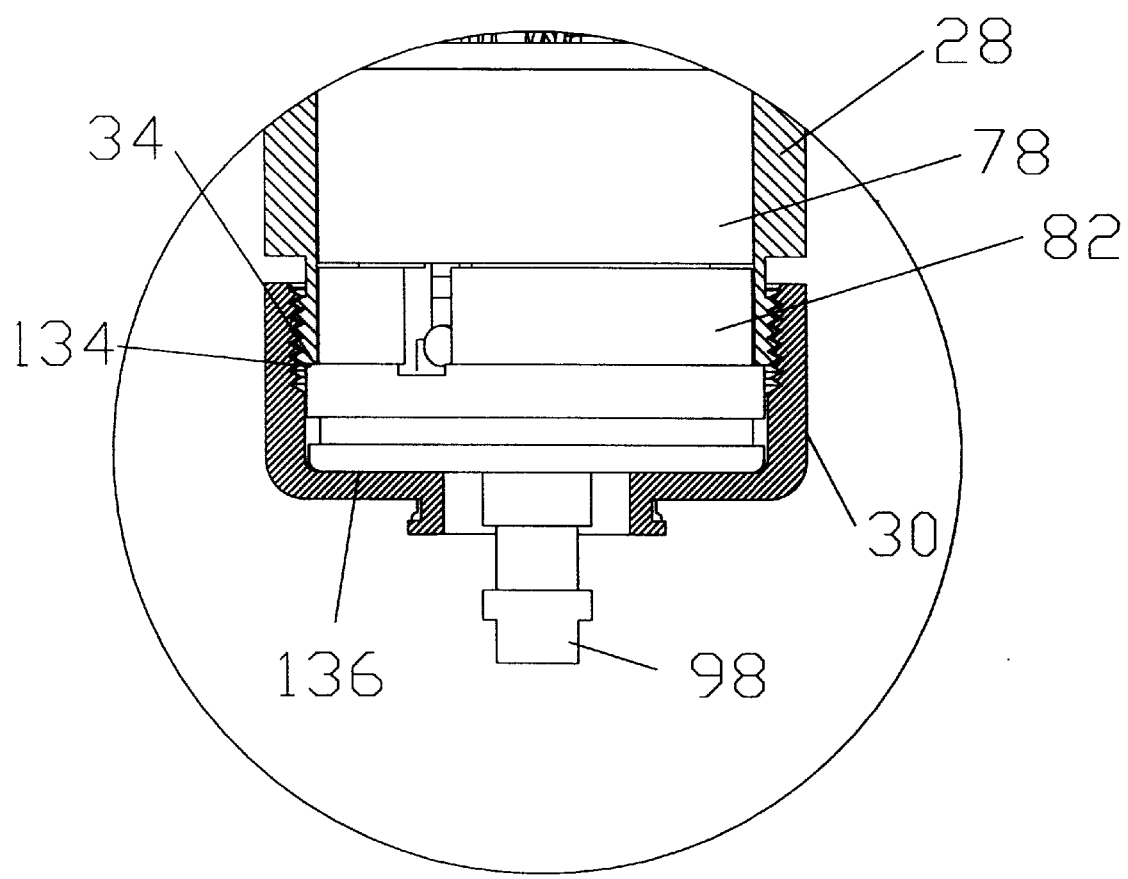
FIG. 13 is a cross-sectional side view of a bottom of the probe according to the present invention.
Figure 14:
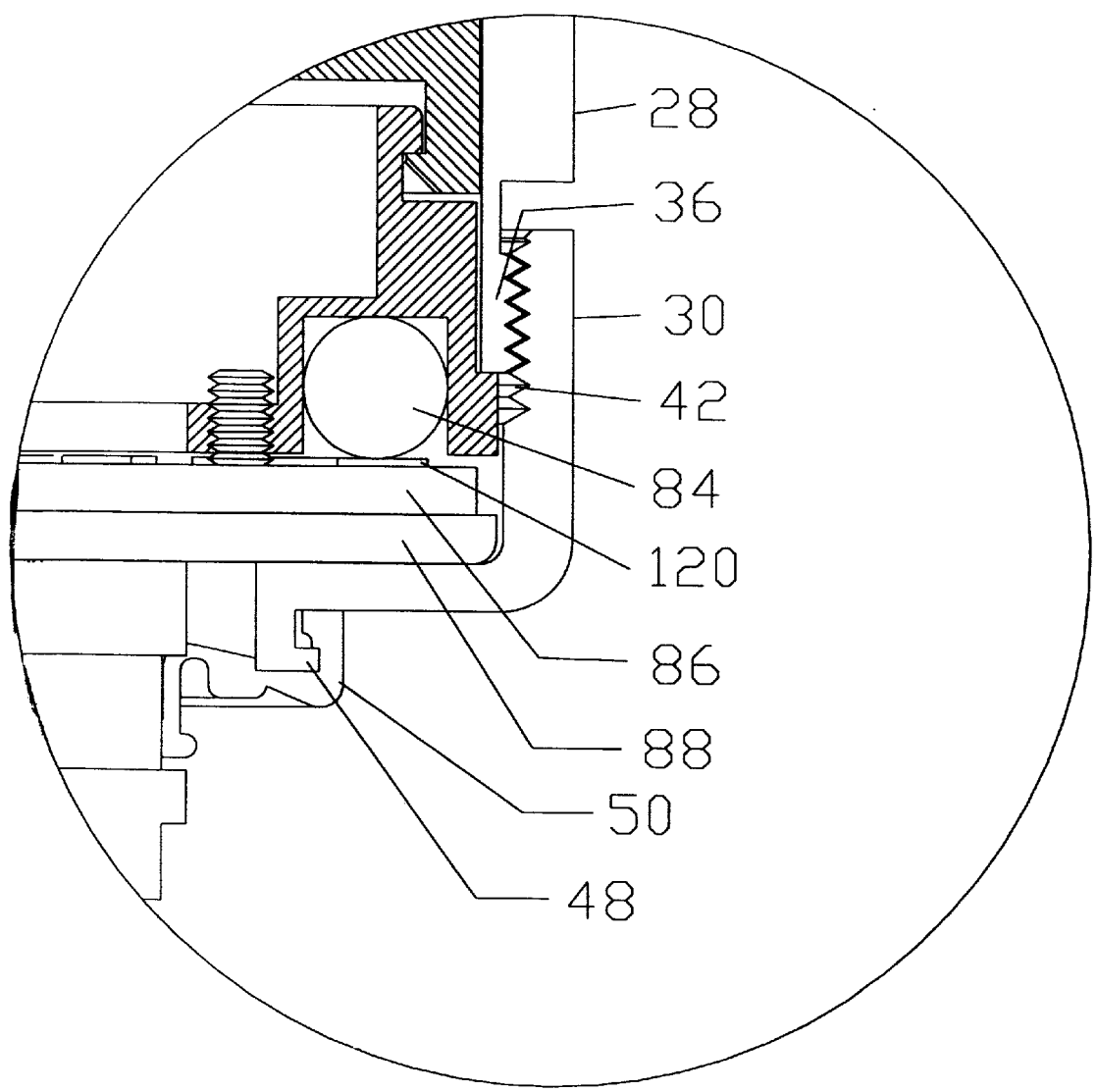
FIG. 14 is a cross-sectional side view of a bottom of the probe according to the present invention.

The lower circuit board 86 acts as a lower plate to pressure the balls 84 into the ball holes 114. The lower circuit board 86 includes a contact pad 120 for each ball 84, as shown in FIGS. 8, 12, and 14. Each contact pad 120 is wired with a wire 90 to the upper circuit board 72. The lower circuit board 86 is secured to the bottom of the housing 82 using the support ring 88 and screws 122, as shown in FIGS. 2 and 4. The support ring 88 and the lower circuit board 86 both include screw holes 124 to receive the screws 122, which are screwed into the housing 82. The support ring 88 keeps the lower circuit board 86 flat when pressed against the balls 84. The spring cap 78 and the housing 82 are configured to assemble by snapping together to secure the stylus mount 80 in the housing 82, as shown in FIGS. 2 and 10–11. The spring cap 78 is shown with a groove 126 and ridge 128 configuration which snaps together with a groove 126 and ridge 128 configuration of the housing 82. The spring 76 is positioned against and between an inside surface 130 of the spring cap 78 and the pins 102 of stylus mount 80. Where a bottom end 132 of the spring 76 rests against the pins 102 of the stylus mount 80. The spring 76 provides a tension force against the three pins 102, where the pins 102 are pressured against the three sets of paired balls 84. The housing 82 also includes a lip 134 extending around the bottom 110 of the housing 82. The internal assembly 20 is inserted into the bottom 34 of the cylinder 28 until the lip 134 of the housing 82 comes against the bottom of the cylinder 28, as shown in FIG. 13. The end cap is then threaded onto the bottom of the cylinder 28, whereby the inside surface 136 of the bottom 44 of the end cap comes against the support ring 88 of the internal assembly 20. With the end cap on the cylinder 28, the internal assembly 20 is rigidly secured in the cylinder 28 of the probe 10.

Figure 15:
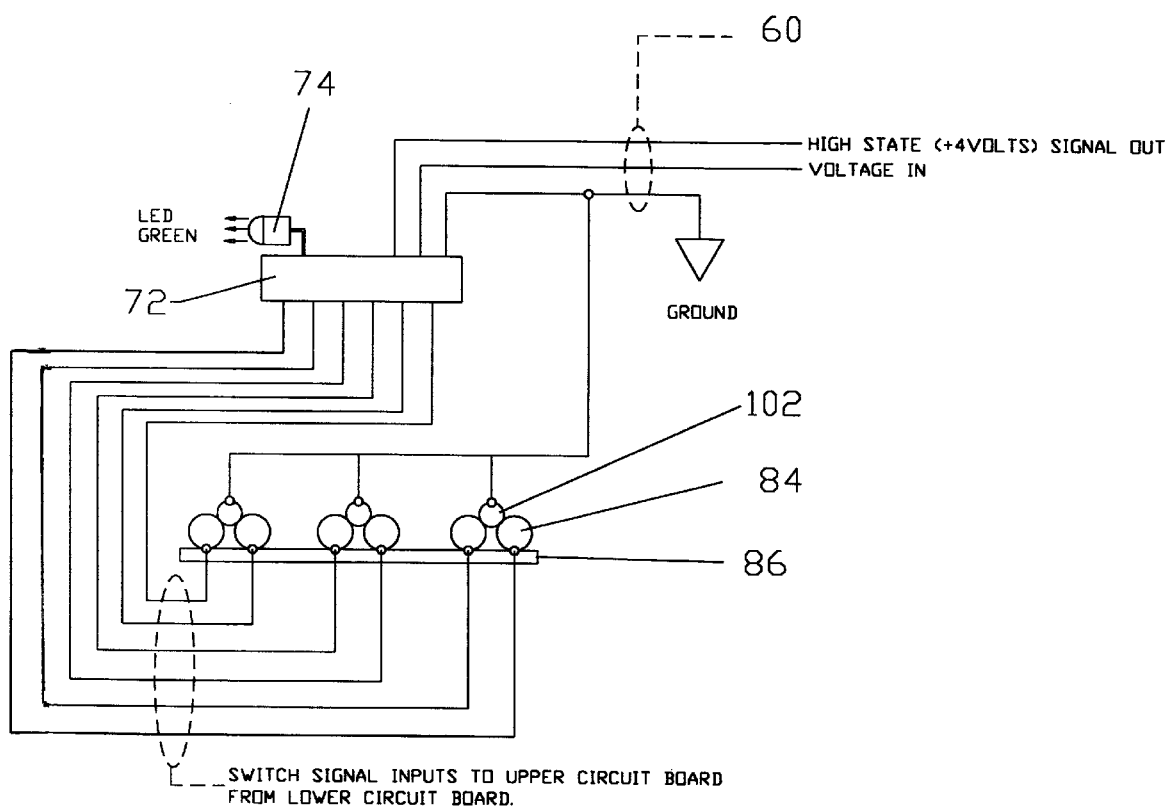
FIG. 15 is a schematic of the wiring of the probe according to the present invention.
Figure 16:
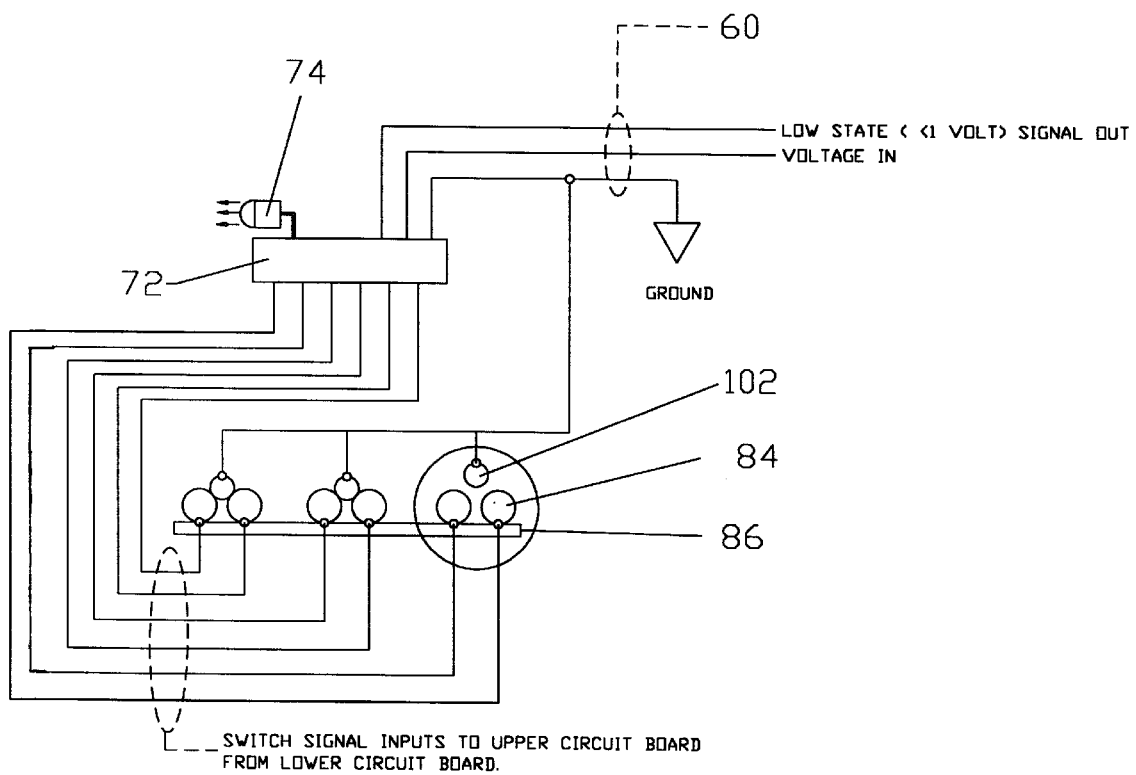
FIG. 16 is a schematic of the wiring of the probe according to the present invention.

The steel pins 102 attached to the stylus mount 80, six carbide balls 84 and the lower circuit board 86 make up six precision electrical switches, as shown in FIGS. 4, and 15–16. The six switches are formed by the three pins 102 against the six balls 84. Where the pins 102 are the ground and the balls 84 are connected to upper circuit board 72 by the contact pads 120 and the wires 90 of the lower circuit board 86. Each contact pad 120 is wired to a series of diodes on the upper circuit board 72, as shown in FIG. 4, and 15–17.

Figure 17:
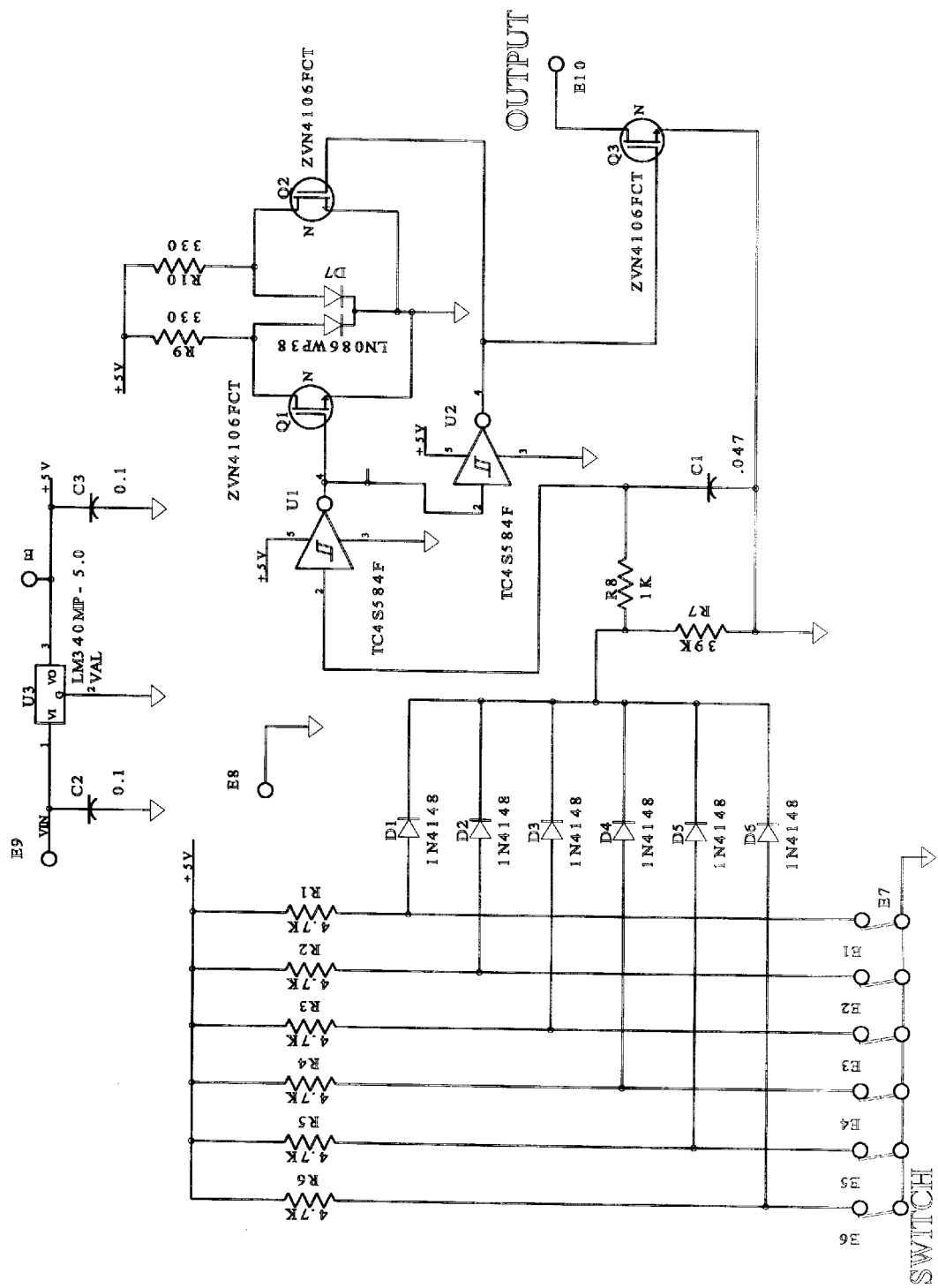
FIG. 17 is a schematic of the electronics of the probe according to the present invention.

These diodes act as logic gates. The series of logic gates drive the output signal as well as the LED 74 located on the upper circuit board 72. There is an input voltage which enters through the connector receptacle 60 and onto the upper circuit board 72 for powering the probe 10. When all the pins 102 are in contact with all of the balls 84, the logic gate on the upper circuit board 72 is grounded and switches to a high state, which allows a 4 or more volt output signal from the probe 10 to the computer. When one or more pins 102 breaks contact with one of the balls 84 due to movement of the stylus 16, the ground is broken. Once the ground is broken, the logic gate on the upper circuit board 72 is ungrounded and switches to a low state, which allows a less than 1 volt output signal from the probe 10 to the computer. FIG. 17 shows a logic diagram for the probe 10. The computer includes software which knows the position of the probe 10 and the direction the probe 10 is moving. The computer software uses the output signals to record the position of the tip 22 of the stylus 16 when it is deflected. The LED 74 is the color GREEN when the stylus 16 is not deflected and all switches are closed and the LED 74 is the color RED when the stylus 16 is deflected and any of the six switches are open. The LED 74 will remain RED and the output signal will remain below 1 volt while the stylus 16 is deflected. The output signal will be greater than 4 volts and the LED 74 will be green when the stylus 16 is not deflected. The LED 74 is positioned to illuminate the, clear lens 70, which provides a simple outside status indication of the probe 10 and the stylus 16.

While different embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention which is to be given the full breadth of any and all equivalents thereof.

I claim:

1. A touch probe to be mounted to a computer controlled machine comprising; a body; a stylus and a shank; wherein said shank comprises: a top cap, a machine attachment shaft extending upward to be attached to said machine and a reversed tapered boss extending downward from said top cap; and wherein said reversed tapered boss is completely fitted into said body at an open top of said body such said top cap covers said open top of said body and said tapered boss reduces in taper towards said top cap.

2. The touch probe of claim 1, wherein said body includes an open ended top; wherein at least two screw holes are located on said body in relation to said reversed tapered boss when said reversed tapered boss is positioned inside said open ended top of said body; and further including at least three set screws screwed into said at least three screw holes such that said at least two set screws enter into said body and against said reversed tapered boss in order to adjustably secure said shank to said body.

3. The touch probe of claim 2, wherein said at least three set screws are conical set screws.

4. A touch probe to be mounted to a computer controlled machine comprising; a body; a stylus and a shank; and wherein said probe further includes an internal assembly internal to said body comprising:

electronics to provide signals to a computer of said computer controlled machine when said stylus is deflected;

a stylus mount including a top and a bottom, said bottom for receiving said stylus and said stylus mount able to conduct electrical current;

at least three pins extending from said top of said stylus mount;

a housing to receive the insertion of said stylus mount, said housing having an open top, a continuous side and a bottom, said bottom having a center hole to allow passage of said bottom of said stylus mount and said bottom having six ball holes along a periphery of said bottom;

six balls which can conduct electrical current, said balls sized such that only a portion of the balls extend through said ball holes and into said housing, said ball holes arranged in three paired sets to arrange said balls into three sets of paired balls such that each set of said paired balls supports one of said pins of said stylus mount between said paired balls when said stylus mount is inserted into said housing;

a lower plate including contact pads for each ball, said lower plate attachable to said bottom of said housing for securing said balls between said lower plate and said bottom of said housing such that each ball is in contact with a contact pad, and said contact pads wired to said electronics; and wherein said shank comprises: a machine attachment end, a top cap and a reversed tapered boss; wherein said body includes an open ended top;

wherein at least two screw holes are located on said body in relation to said reversed tapered boss when said reversed tapered boss is positioned inside said open ended top of said body; and further including at least three set screws screwed into said at least two screw holes such that said at least two set screws enter into said body and against said reversed tapered boss in order to secure said shank to said body.

5. A touch probe to be mounted to a computer controlled machine comprising; a body; a stylus and a shank; wherein said probe further includes an internal assembly internal to said body comprising:

electronics to provide signals to a computer of said computer controlled machine when said stylus is deflected;

a stylus mount including a top and a bottom, said bottom for receiving said stylus and said stylus mount able to conduct electrical current;

at least three pins extending from said top of said stylus mount;

a housing to receive the insertion of said stylus mount, said housing having an open top, a continuous side and a bottom, said bottom having a center hole to allow passage of said bottom of said stylus mount and said bottom having six ball holes along a periphery of said bottom;

six balls which can conduct electrical current, said balls sized such that only a portion of the balls extend through said ball holes and into said housing, said ball holes arranged in three paired sets to arrange said balls into three sets of paired balls such that each set of said paired balls supports one of said pins of said stylus mount between said paired balls when said stylus mount is inserted into said housing; and a lower plate including contact pads for each ball, said lower plate attachable to said bottom of said housing for securing said balls between said lower plate and said bottom of said housing such that each ball is in contact with a contact pad, and said contact pads wired to said electronics.

6. The touch probe of claim 5, wherein said housing includes a slot in said side for each pin, said slots to act as a guide for movement of said stylus mount.

7. The touch probe of claim 5, wherein said lower plate is a circuit board.

8. The touch probe of claim 7, further including a support ring for attaching said circuit board to said bottom of said housing.

9. The touch probe of claim 5, further including a spring to provide a tension to force said pins against said balls.

10. The touch probe of claim 9, further including a spring cap to force said spring towards said pins, wherein said spring cap and housing assemble together to secure said spring and stylus mount and wherein said spring cap and housing assembly are completely inside said body.

11. The touch probe of claim 10, wherein said electronics are mounted on an upper circuit board mounted to a top of said spring cap.

12. The touch probe of claim 5, wherein said body includes a cylinder having an open ended top and an open ended bottom, and an end cap which attaches to said bottom of said cylinder; wherein said end cap includes a hole to allow passage of said stylus; wherein said bottom of said housing includes a lip such that when said housing is inserted into said open ended bottom of said cylinder said lip does not pass into said cylinder, thereby securing in place said housing and all that is attached to said housing when said end cap is attached to said open ended bottom of said cylinder.

13. The touch probe of claim 5, wherein said electronics includes an outside status light to indicate said stylus is deflected.

14. The touch probe of claim 5, further including a connector receptacle for interfacing said electronics with said computer.

15. The touch probe of claim 5, wherein said pins of said stylus mount are connected to a ground such that when said pins and balls are all in contact, said balls are grounded as seen by said electronics; and wherein any one of said pins breaks contact with a ball due to a deflection of said stylus, said electronics see the removal of that ground.

16. The touch probe of claim 15, wherein said electronics include logic gates to determine if any of the pin-ball contacts have been broken and send a status of such to said computer.

17. A touch probe to be mounted to a computer controlled machine comprising; a body; a stylus and a shank; and wherein said probe further includes an internal assembly internal to said body comprising:

electronics to provide signals to a computer of said computer controlled machine when said stylus is deflected;

a stylus mount including a top and a bottom, said bottom for receiving said stylus and said stylus mount able to conduct electrical current;

at least three pins extending from said top of said stylus mount;

a housing to receive the insertion of said stylus mount, said housing having an open top, a continuous side and a bottom, said bottom having a center hole to allow passage of said bottom of said stylus mount and said bottom having six ball holes along a periphery of said bottom;

six balls which can conduct electrical current, said balls sized such that only a portion of the balls extend through said ball holes and into said housing, said ball holes arranged in three paired sets to arrange said balls into three sets of paired balls such that each set of said paired balls supports one of said pins of said stylus mount between said paired balls when said stylus mount is inserted into said housing;

a lower plate including contact pads for each ball, said lower plate bottom of said housing for securing said balls between said lower plate and said bottom of said housing such that each ball is in contact with a contact pad, and said contact pads wired to said electronics; and wherein said housing includes a slot in said side for each pin, said slots to act as a guide for movement of said stylus mount; wherein said lower plate is a circuit board; further including a spring to provide a tension to force said pins against said balls; and further including a spring cap to force said spring towards said pins.

18. The touch probe of claim 17, wherein said shank comprises: a machine attachment end, a top cap and a reversed tapered boss; wherein said body includes an open ended top; wherein at least three screw holes are located on said body in relation to said reversed tapered boss when said reversed tapered boss is positioned inside said open ended top of said body; and further including at least two set screws screwed into said at least two screw holes such that said at least two set screws enter into said body and against said reversed tapered boss in order to secure said shank to said body.

\* \* \* \* \*